United States Patent [19]

Maurer

[11] Patent Number: 4,548,316

[45] Date of Patent: Oct. 22, 1985

[54] RUN-BACK SAFETY MECHANISM FOR CONVEYOR APPARATUS

[75] Inventor: Ruprecht Maurer, Bad Homburg, Fed. Rep. of Germany

[73] Assignee: Ringspann Albrecht Maurer, K.G., Bad Homburg, Fed. Rep. of Germany

[21] Appl. No.: 551,347

[22] Filed: Nov. 14, 1983

[30] Foreign Application Priority Data

Dec. 8, 1982 [DE] Fed. Rep. of Germany ....... 3245347

[51] Int. Cl.⁴ .................. B65G 23/26; B65G 43/08
[52] U.S. Cl. ................................. 198/835; 198/856; 192/48.92
[58] Field of Search .............. 198/854, 856, 323, 835, 198/781; 192/41 A, 45, 45.1, 46, 48.92, 56 R

[56] References Cited

U.S. PATENT DOCUMENTS

| | | | |
|---|---|---|---|
| 1,273,952 | 7/1918 | Tibbetts | 192/48.92 |
| 1,572,818 | 2/1926 | Smith | 198/835 |
| 2,085,271 | 6/1937 | Pfluger | 192/48.92 |
| 2,818,950 | 1/1958 | Harless | 192/48.92 |
| 2,926,765 | 3/1960 | Heid | 192/48.92 |
| 3,012,645 | 12/1961 | Gensheimer et al. | 192/45 |
| 3,072,234 | 1/1963 | Maurice et al. | 192/48.92 |
| 3,187,598 | 6/1965 | Hennessey et al. | 192/48.92 |
| 3,249,187 | 5/1966 | McDowall | 192/48.92 |
| 3,598,212 | 8/1971 | Giese | 192/41 A |
| 3,702,649 | 11/1972 | Giese et al. | 192/41 A |
| 3,750,783 | 8/1973 | Ohtsuka et al. | 192/48.92 |

FOREIGN PATENT DOCUMENTS

1072128 12/1959 Fed. Rep. of Germany ...... 198/854

Primary Examiner—Joseph E. Valenza
Assistant Examiner—Daniel R. Alexander
Attorney, Agent, or Firm—Frishauf, Holtz, Goodman & Woodward

[57] ABSTRACT

To permit unloading and release of statically stored dynamic energy in a run of a loaded conveyor, e.g. a mining conveyor belt, the return stop mechanism or back-run safety mechanism is coupled to a fixed structure, such as a frame (50, 73, 89) through a releasable friction coupling which is formed by a two-part holding ring (48, 49; 71, 72; 87, 88) coupled to the frame, and having facing inwardly directed surfaces which can be clamped, by controlled friction force against facing surfaces of an outer operating ring (45, 64, 84) of a ratchet or other one-way clutch or drive to prevent back-run or a return stop for the conveyor. Upon controlled release of the frictional engagement, for example by counter-acting spring force or releasing a spring force, the friction surfaces are permitted to slip, thus permitting dissipation of stored energy in the conveyor, for example due to sudden stoppage upon malfunction or external interference, for example by rocks, boulders or the like. The two-part holding ring is preferably constructed with interengaging telescoping ring parts to provide a protective surrounding structure, requiring only minimum radial space.

17 Claims, 10 Drawing Figures

RUN-BACK SAFETY MECHANISM FOR CONVEYOR APPARATUS

BACKGROUND OF THE INVENTION

Reference to related patents and application, assigned to the assignee of the present application, the disclosures of which are hereby incorporated by reference:
U.S. Pat. No. 3,598,212, GIESE.
U.S. Pat. No. 3,702,649, GIESE et al.
U.S. Ser. No. 519,692, filed Aug. 2, 1983, HAGEN & SEBULKE.

1. Field of the Invention

The present invention relates to conveyor apparatus, transport apparatus, and the like, which are operated in one direction, hereinafter the "forward direction" and include a run-back lock or safety mechanism to prevent reverse operation.

2. Description of the Prior Art

Various types of conveyor apparatus, such as belt conveyors, link conveyors, chain conveyors, trolley or tramway systems which may be suspended, or rope or cable-operated or pulled, lift apparatus such as ski lifts and the like, frequently include a run-back locking mechanism, located between the drive motor for the conveyor apparatus and a driven shaft, connected to the drive belt, cable or the like of the conveyor. The run-back safety mechanism prevents reverse operation of the conveyor. In one such safety mechanism, which includes a return stop, a one-way clutch is provided which has a ring-shaped element, for example in form of an outer ring. A circular element is located concentrically with the outer element, and one-way coupling elements are located between the outer and inner ring. The inner ring is coupled to the conveyor or transporter shaft and arranged to permit free running thereof in one predetermined direction, but to cause the coupling elements to engage and lock with the outer ring upon reverse running of the conveyor shaft, and hence of the inner ring. The outer ring, in accordance with customary procedure, is secured in fixed position, for example to the frame of the machine. Upon a tendency or actual operation of the conveyor, and hence of the conveyor shaft in reverse direction, the locking or coupling elements will lock against the outer ring, and prevent such reverse rotation. The respective rings can be self-centering by their respective position within each other.

While the present invention is applicable to various types of transport or conveyor arrangements, the problems which arise in connection therewith, and the solution, will be described with reference to a conveyor having an upper and a lower or reverse run by way of illustration and example.

Conveyor belts which are used, for example, in the mining industry, usually have material such as rocks, coal or the like placed on the upper run of the conveyor belt. It is unavoidable that pieces of rock or other material being moved by the conveyor fall off, and fall on the lower run thereof, typically beneath the upper run, and operating in reverse direction, that is, they are returned by the lower run towards the end sheave, or return drum. If the goods being returned to the return drum are large, and hard, that is, will not crush, they may jam against the turn-around drum, causing excessive friction and wear, and triggering safety devices which stop the conveyor. It has been customary to manually, physically remove rocks, lumps and other pieces of coal or other minerals which may have been supplied and which caused stoppage of the conveyor by wedging between the lower run and the turn-around drum or sheave. Removal, typically, requires forcible removal with a pick axe or the like. As soon as the jam has been removed, the conveyor belt, due to stored elasticity in the upper run and in the drive shaft and drive system, will start to move, even if no drive power is applied. This sudden movement, due to stored elasticity within the lengthy belt elements, cables, and the like in the conveyor, is highly dangerous to the operating personnel, and may lead to severe, sometimes fatal accidents. It has happened that an operator was crushed between the lower run of a conveyor belt and the turn-around drum or sheave.

A reverse or run-back safety mechansim thus should be capable or being released with respect to its locking effect to such an extent that controlled movement of the conveyor permits controlled release of stored energy, that is, energy which has been stored due to sudden stoppage of conveyor operation when elements become wedged between the conveyor and the drum. The difficulty with such arrangements is, however, that the run-back safety mechanism must not be completely released, since, otherwise, the conveyor would run backwardly after removal of wedging interfering materials due to the weight of the material on the upper run of the conveyor, particularly if the conveyor is moving this material against the force of gravity in an upward direction.

Conveyors and other similar apparatus frequently are driven by a multiple drive, for example by being driven from two or more motors, one on either side of the conveyor, and supplied with a suitable step-down gearing. The upper end of the conveyor may be driven by two looping drums, the conveyor belt being deflected several times in order to obtain maximum winding or looping angles of the belt about conveyor drums.

Conveyors which have multiple drives have the additional difficulty that, if the drive power is suddenly turned off, different return torques have to be accepted by the respective run-back safety mechanism. In selected instances it may occur that one of the safety back-up mechanism or back-run locks must accept practically all the resulting torque, and can be overloaded thereby. It may be desirable, therefore, to utilize torque limiting devices in connection with run-back safety mechanisms, or return-stop locks, so that the one or the other of the one-way clutches can move slightly counter the locking direction to equalize torques among groups of such reverse-run locks or clutches.

It has been proposed in connection with hoists, cranes, and the like, to include one-way clutches between a drive motor and a hoist pulley or sheave. Upon lifting of a load, the sheave can run freely and overrun the one-way clutch. To drop a load, the one-way clutch is permitted slippage by not mounting the outer ring of the one-way clutch fixedly on a frame or the like, but rather to incorporate a disk brake or clutch between the outer ring of the one-way clutch and a fixed building construction or a frame. Typically, the outer ring of the one-way clutch includes an outer gearing to which the disk brake or clutch is connected. The construction substantially extends the space requirements of the entire apparatus in radial direction, as well as in axial direction, and must be kept meticulously clean to prevent contamination of the brake portion or lamella, which may reach that part of the system from gearing and other elements. Load dropping brakes on hoists and similar apparatus are not subjected to the type of stresses to which conveyors are subjected and, of course, a load which is being hoisted and stopped suddenly will not continue upwardly against force of gravity, as a conveyor or similar transporter might, which is capable of statically storing considerable dynamic energy.

SUMMARY OF THE INVENTION

It is an object to provide a return stop or run-back safety mechanism, particularly suitable for conveyors, transport systems, and the like, which permits controlled reverse operation if such should become necessary, for example under emergency or improper operating conditions. The permitted reverse operation, in spite of the presence of a one-way clutch or the like, should be easily controllable and readily adjustable. Additionally, the unit should be compact so that it will not substantially extend the size of the elements in radial and/or axial direction. Compatibility of existing equipment with improved equipment in accordance with the invention is, further, desirable.

Briefly, a releasable friction coupling is interposed between one of the coupling elements of the one-way clutch, for example between the outer ring and a fixed frame location. The releasable friction coupling includes a two-part holding ring which has axial surfaces paired with, and fitted to face axial surfaces of the clutch element which, in the prior art, was fixedly secured to a frame or other fixed position. At least one of the surfaces, for example the outer ring of the one-way clutch, has a friction surface applied thereto. One part of the two-part holding rings is secured to the frame and faces one axial surface of the ring, for example the outer ring, of the one-way clutch. The other part is located in non-rotatable, but axially movable position and connected to the one part or, respectively, to the frame, and to face the other axial surface of the clutch element, for example the outer ring. The two parts of the holding ring are adjustably, releasably clamped together, for example by a pressure force arrangement, adjustably pressing the elements towards each other, thereby clamping the friction surface of the clutch ring therebetween. By controllably releasing the clamping force, the clutch element which, normally, would be fixed or secured to the frame or to a building structure, thus can slip with respect to the two-part rings, under controlled condition, to thereby permit release of stored energy in the runs, belts, cables or the like, of the conveyor or transport system with which the apparatus being used.

Basically, the clutch ring, together with the two-part rings, forms a disc brake-like construction, which is controllable, so that the reverse torque to be accepted by the overall return stop or run-back stop mechanism can be adjusted, set for a predetermined value, or limited not to exceed an upper level. The upper limit of the reverse torque, of course, is determined by the highest permissible torque which can be transmitted by the respective clutch, or which can be applied to the shaft of the one-way clutch element. By controlling the clamping force of the two parts of the holding ring with respect to each other, the run-back braking effect can be so decreased that stresses which will build up within cables, conveyor belts, and the like upon sudden stoppage thereof can be gradually released, and accepted. Any material which might have fallen off the upper run of the conveyor onto the lower run can thus be readily removed. Dropping the reverse or run-back stopping operation must, of course, be so adjusted and controlled that the conveyor belt, cable or other transport apparatus will not move in reverse direction after removal of any interfering or wedging element from between the lower run and a driving drum. Ordinarily, this can be so managed that, if rocks, lumps and the like fall from the upper run of a conveyor belt on to the lower run, and the operation of the conveyor is blocked, the locking effect of the run-back or return stop mechanism is slightly released, just enough to release tensions built up in the conveyor belt, cables or the like, and, further, until tension and stresses within the upper run or drive portion of the system have been dissipated. Thereafter, the original locking position of the return stop or run-back mechanism can be reestablished, and then the material causing blockage removed, so that the conveyor can continue to operate in normal manner. The arrangement in accordance with the present invention has the advantage that the space required for the improved return stop mechanism is hardly increased, and that the radial space requirements, particularly, are not essentially changed. In accordance with a preferred feature of the invention, the one-way clutch has an outer clutching ring, the end faces of which are used directly to form two oppositely located disk brake surfaces, the two-part holding ring then being located adjacent these braking surfaces, for example in ring form, to clamp the surfaces of the outer ring between the respective parts of the two-part holding ring.

The one-way clutch can be constructed in various ways; clamping force between the two parts of the holding ring can be obtained by screw connections, springs, combinations of springs and screw connections, fluid pressure, for example hydraulic pressure force and the like.

BRIEF DESCRIPTION OF THE DRAWINGS

The drawings illustrate the system and features of the invention, using a mining-type belt conveyor as an example.

DETAILED DESCRIPTION

Figure 1:
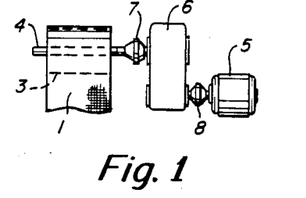
FIG. 1 is a schematic top view of the head portion of a drive arrangement for a belt conveyor.
Figure 1A:
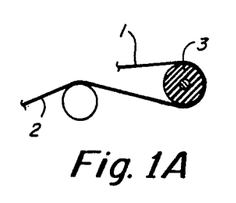
FIG. 1A is a highly schematic side view of the arrangement of FIG. 1.

An upper run 1 (FIG. 1A) of a conveyor belt is looped about an upper transport drum 3, to form, after looping, a lower run 2, positioned beneath the upper run 1. The drum 3 is secured to an driven by a shaft 4 which is, in turn, driven by a motor 5 through step-down gearing 6. A return stop or run-back safety mechanism 7 is interposed between the gearing 6 and the shaft 4; a similar mechanism is interposed between the motor 5 and the gearing 6. For many installations, it is sufficient if only one such return stop mechanism 7, 8 is used, and, if so, use of the mechanism 8, between motor 5 and gearing 6, is preferred. In this manner, the one-way clutch is located on the shaft which has the highest speed so that it can be dimensioned smaller than the one-way clutch 7, since the power transfer is, as well known, the product of speed and torque. The arrangement in accordance with FIG. 1 can also be visualized as a tandem drive by, for example, duplicating the system 5, 6, 7, 8 or 5, 8, 6, respectively, at the left side of the conveyor belt 1 and on the left side of the shaft 4, with reference to FIG. 1.

Figure 2:
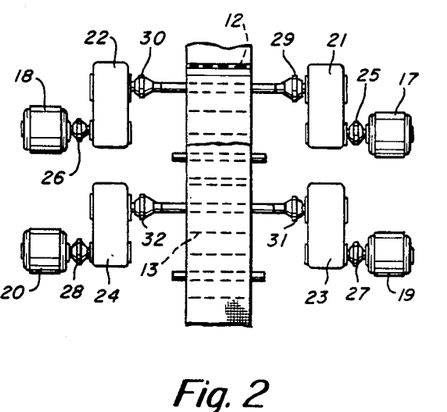
FIG. 2 is a schematic top view of the head portion of one end of a four-motor drive arrangement for a belt conveyor.
Figure 2A:
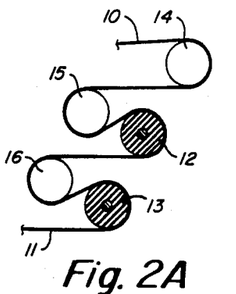
FIG. 2A is a highly schematic side view of the arrangement of FIG. 2.

A conveyor system for very large and heavy loads, or for steeper grades, may use a plurality of looping drums. FIGS. 2 and 2A show such an arrangement. An upper run 10 and a lower run 11 of the conveyor are connected by looping about two driven drums 12, 13, and guiding the conveyor runs 11, 12 by additional guide rollers or drums 14, 15, 16, to obtain as large a looping angle about the drums 12, 13 as possible and, for example, by means of roller 14, suitable separation between the upper run 10 and the lower run 11 of the conveyor belt. The respective drums 12, 13 are driven by motors 17–20, for multiple motor drive, each one of the motors being connected to the respective shafts on the which the drums are positioned by step-down gearing 21–24. Return stop or run-back mechanisms 25–28 are interposed between the motors 17–20 and the associated step-down gears 21–24. If desired, additional return stop mechanisms 29–32 may also be used, connected between the output of the step-down gearings 21–24 and the shafts of the respective drums 12, 13.

The problems which arise in conveyor systems of this type have been explained in detail above, see section "Background" hereof. The structural embodiments will now be described.

Figure 3:
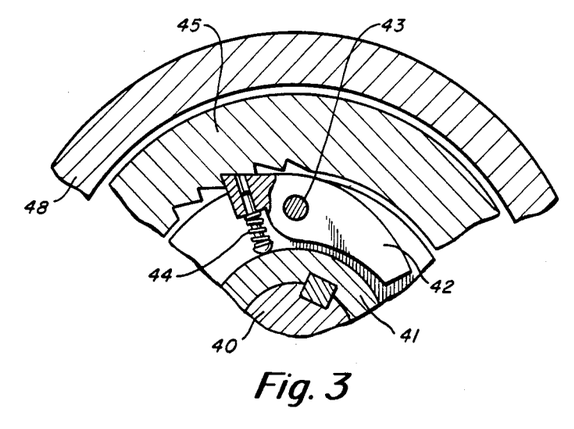
FIG. 3 is a fragmentary axial section through a ratchet return stop mechanism, taken along line III—III of FIG. 4.
Figure 4:
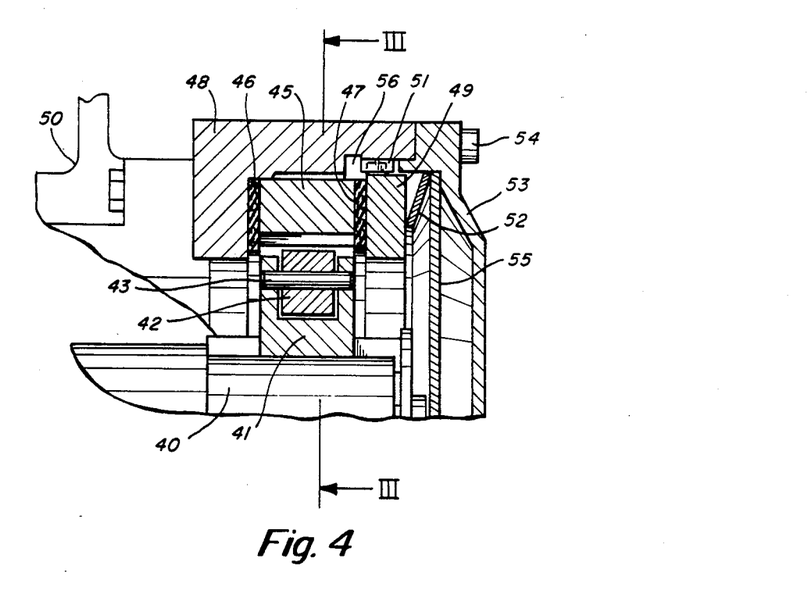
FIG. 4 is a fragmentary radial section of the one-way clutch and mechanism of FIG. 3.

Embodiment of FIGS. 3 and 4: A one-way ratchet locking mechanism is shown. The driven shaft 40, for example the shaft from one of the motors (FIGS. 1, 2), is rotatably coupled to an inner ring 41, for example by being splined thereto, as shown schematically. The inner ring 41 has ratchets 42 pivotably secured thereto to rock about pivots or pins 43. Springs 44 tend to engage the ratchet surfaces with inner teeth of an outer ring 45. This arrangement can be standard and in accordance with any well-known one-way ratchet construction. As best seen in FIG. 3, the ratchet elements 42 are so shaped and arranged with respect to the pivot pin 43 that, upon increasing speed of the shaft 40, the mass of the elements 42 tends to cause outward swinging of the right-hand portion—as seen in FIG. 3—of the ratchet elements, so that the ratchet elements, due to centrifugal force, will be free from engagement with the outer ring 45. This substantially decreases wear on the inner teeth of the outer ring 45 as well as on the ratchet surfaces of the elements 42. The outer ring 45 is centered with respect to a holding or friction ring 48 by concentric fit therein, as will appear.

The outer ring 45 has friction surfaces or friction pads 46, 47 (FIG. 4) secured to its axial faces. The friction surfaces or pads 46, 47 are in engagement with a two-part holding ring formed by friction ring element 48 and friction ring element 49. The friction ring or friction ring element 48 is securely connected with a frame or housing portion 50, for example secured to the foundation on which also the respective motor 5, 17–20 is secured. The frame 50 is shown only schematically and in fragmentary form and may be of any suitable construction. The ring 49 is non-rotatably coupled with the ring 48 by respective inner and outer gearing or splining connections 51. Ring 49 is axially shiftable and movable. A dish or cup spring 52 engages the ring 49. Cup spring 52 is supported by a cover 53 which is secured by springs 54 on the ring 48.

OPERATION

Bias of the spring, and application of spring force by the spring 52 against the ring 49, and hence clamping connection of the ring system 48–49 against the friction surfaces 46, 47 on the outer ring 45 of the one-way clutch, is controlled by tensioning of the screws 54 and, additionally, by insertion or placement of washers 55. By insertion of washers 55 of suitable thickness or number, the force applied by the rings 48, 49 on the friction surfaces 46, 47 can be so controlled that the one-way clutch or one-way coupling or return stop mechanism formed by the ratchet will not be overloaded.

If the conveyor should come to a sudden stop—for example by operation of any well-known and standard safety mechanism in case of wedging of substances between the lower run of the conveyor and a drum, or due to other malfunction, and it is desired to release the tension and stored energy in the upper run, screws 54 are slightly loosened. The screws 54 are preferably uniformly distributed about the circumference of the ring 48 in the manner illustrated, for example, in FIG. 7 with respect to elements 84 therein. Upon loosening of the screws or bolts 54, the spring 52 can slightly release, or become less stressed, so that the friction holding effect of the friction brake formed by the two-part ring system 49, 49, the friction surfaces 46, 47 and the outer ring 45, on which the friction surfaces are located, will decrease. This permits controlled slippage of the outer ring 45, and hence controlled release of tension of the upper run. When the upper run has been suitably relaxed, screws or bolts 54 are again tightened to the position shown in FIG. 4, so that the initial state of the friction brake is reached. Blockage of the conveyor, or other malfunction can then be removed without danger of accidents or sudden uncontrolled forward operation of the conveyor, and the drums about which it is looped, without energization of the drive motor, or motors, therefor, due to stored energy in the conveyor belt or cable or similar transport system.

The friction ring 48 of the reverse or return stop mechanism completely overlaps the friction ring 49. Upon addition of the cover 53, a totally enclosed structure is obtained which prevents ingress of contamination, oil, dirt, dust, or other contaminating substances or particles. Interference with the operation of the friction brake, change of its adjustment, and interference with the operation of the ratchet lock thus is effectively prevented. The space 56 between the rings 48, 49, and in the region of overlap, can be filled with a suitable resiliently expandable filler material to additionally improve the encapsulating effect and prevent contamination of the respective surfaces. In some installations, high-temperature non-melting cup grease may be suitable.

Figure 6:
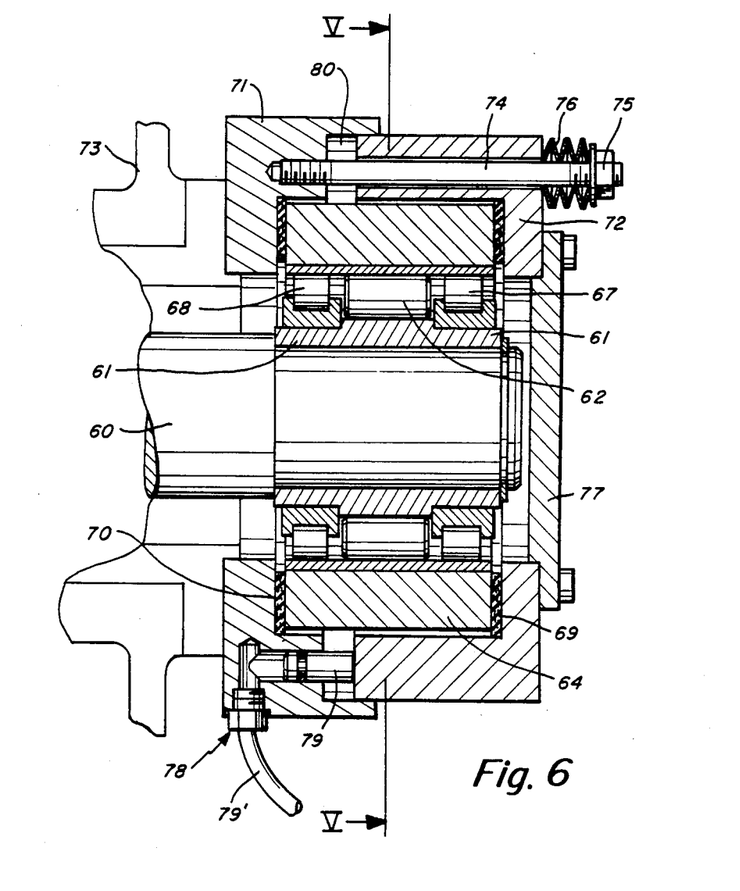
FIG. 6 is a radial section of the mechanism of FIG. 5.
Figure 8:
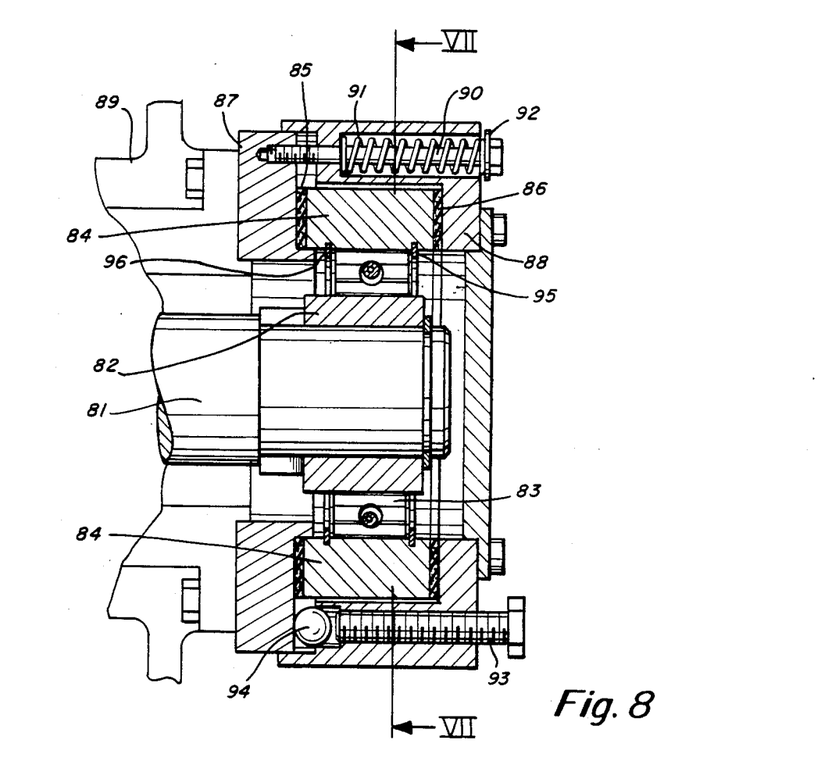
FIG. 8 is a radial section of the mechanism of FIG. 7.

The illustration of FIG. 4—as well as FIGS. 6 and 8—is drawn with the structure seated on a stub shaft. It is possible to mount the return stop mechanism on the end or stub shaft extending from a drum about which the belt is looped, rather than connected between a drive motor, gearing, and the transporting drum. For example, the shaft 40 could be considered as a stub element extending from the left side of the shaft 4 of the drum 3 of FIG. 1. If the shaft 40 is to be a through-shaft, the cover 53 would have to be constructed in ring form, the washers 55 likewise formed with a central opening, and a dirt or dust seal placed between the shaft 40 and the opening in cover 53 surrounding the shaft 40 to maintain the integrity of the space within the cover 53.

Figure 5:
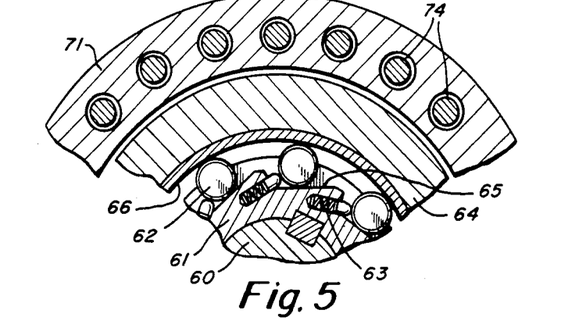
FIG. 5 is a fragmentary section along line V—V of FIG. 6 of a roller-type one-way clutch and return stop mechanism.

Embodiment of FIGS. 5 and 6: The return stop mechanism includes a roller free-wheeling arrangement, having a driven shaft 60 on which an inner ring 61 is secured, for example splined thereto, similar to the arrangement 40/41 of FIG. 3. The outer surface of ring 61 is formed with suitable recesses, in which rollers 62 are located. Springs 63 tend to press the rollers against the inner surface 66 of an outer ring 64. As well known, the one-way clutch or free-wheeling arrangement operates by movement of the rollers 62 upwardly on an inclined surface 65 of the inner ring 61, to then wedge against the surface 66 of the outer ring 64. The actual operating surface of the outer ring 64 is formed by a hardened steel sleeve, which forms the surface 66. Roller bearings 67, 68 are located adjacent the rollers 62 to provide for radial guidance of the outer ring 64 with respect to the inner ring 61—see FIG. 6.

Similar to the arrangement described in connection with FIGS. 3 and 4, friction surfaces 69, 70 are located on the outer surfaces of the outer ring 64. Holding rings 71, 72 can be engaged with the friction surfaces 69, 70. The holding ring 71 is securely connected to a frame 73, of which only a portion is shown schematically. The holding ring 72 is axially shiftable with respect to holding ring 71, but non-rotatable with respect thereto. This non-rotatable, axially shiftable arrangement is obtained by bolts 74 which extend through the ring 72 and which are screwed into the ring 71—see FIG. 6. The bolts are located uniformly distributed about the circumference of the rings 71, 72, as seen in FIG. 5. A package of cup springs or dish springs 76 is located between the head end of the bolt 74 and the ring 72. The head end is formed by a nut, with an interposed washer, to provide for adjustment of the tension of the leaf spring package or stack 76 which is being exerted against the ring 72. A cover plate 77 closes off the mechanism with respect to the end of the shaft 60; as noted before, the cover plate 77 may be formed with a central opening to permit passage of the shaft 60 with a suitable interposed dust and anti-contamination seal.

OPERATION

The basic operation is similar to that described in connection with FIGS. 3 and 4. The bolts 74, uniformly distributed over the circumference, in combination with the springs 76 and nuts 75 on the ends of the bolt, apply a braking force against the rings 71, 72, which is transferred through the friction surfaces 69, 70 on the outer ring 64 of the free-wheeling or one-way return stop clutch mechanism. Overloading of the shaft 60 due to sudden stoppage of a conveyor belt, cable or the like between a plurality of drives is prevented by suitable adjustment of the nuts 75, which controls the spring force of spring 76 and may permit slight slippage. If it is desired to manually to manually release the braking effect, for example to remove blockage of the conveyor belt, to release tension within the conveyor belt and the like, the outer ring 72 is pushed counter the force of the spring 76, for example by suitably circumferentially distributed cylinder piston arrangements 78. The pistons 79 operate against the force of the spring 76 upon receiving fluid pressure, for example hydraulic fluid pressure in control line 79'. It is desirable to include a pressure measuring instrument, such as manometer in the connection line 79' to supervise and monitor the pressure being applied to the piston 79, and thus control the slippage of the outer ring 64 with respect to the frame 73. Upon drainage or release of hydraulic or pneumatic pressure in line 79', the previously controlled adjustment of the brake by the tension of the spring 76 will be obtained.

The friction rings 71, 72 are guided within each other in form of a piston-cylinder arrangement; the telescoping positioning provides for complete encapsulation of the free-wheeling mechanism formed by the inner ring 61, rollers 62, and surface 66 on the outer ring 64. The space 80, providing a resilient and moving space again may be filled with suitable expansible and compressible filler material, for example the aforementioned grease.

Figure 7:
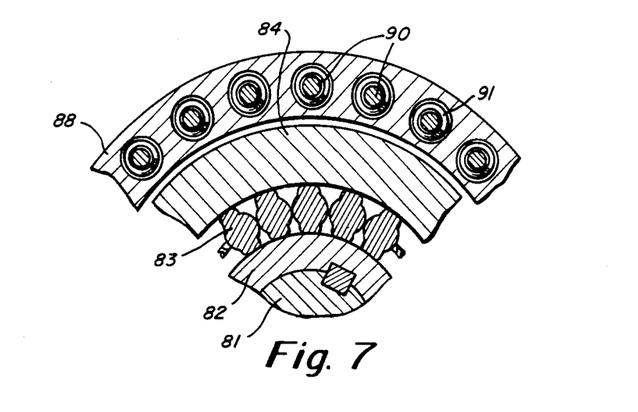
FIG. 7 is a radial section along line VII—VII of FIG. 8 of a wedging-type one-way clutch and locking mechanism.

Embodiment of FIGS. 7 and 8: The return stop mechanism, as in the previous example, includes an inner ring 82 rotatably coupled to a shaft 81. A plurality of wedging elements 83, for example retained in a holding ring or race, or otherwise secured as well known, are located between an inner ring 82 and an outer ring 84. The wedging elements are pivotably mounted to rotate into a position in which external wedging surfaces either interfere or wedge between the inner and outer rings 82, 84, or in which the wedging elements assume a position inclined with respect to the radial position shown in FIG. 7, so as to release coupled connection between the inner and outer rings 82, 84 when the inner ring 82 operates in one direction, but being picked up and wedging between the rings 82, 84, upon reverse rotation of the ring 82. Structures of this type are well known. The outer ring 84 is maintained in coaxial relationship with respect to the shaft 81 and inner ring 82 by being fitted within the friction ring 87.

The axial surfaces of the outer ring 84 have friction layers 85, 86 applied thereto (FIG. 8) which can be or, or are in engagement with rings 87, 88. Ring 87 is securely connected to the frame or housing part 89; ring 88 is non-rotatably, but axially movably connected to the ring 87. Bolt 90 passes through the ring 88, and are screwed into the ring 87. The bolts 90, are, preferably, uniformly distributed about the circumference of the ring 88—see FIG. 7. Openings are formed in the rings 88 to permit passage of the bolts 90, and further to accept helical springs 91 which are engaged against an inner shoulder of the respective bores on the one hand, and against a washer 92 beneath a bolt head of the bolts 90.

OPERATION AND ADJUSTMENT

To first set the holding torque of the one-way clutch or free-wheeling arrangement, the bolts 90 are screwed more or less into the respectively tapped openings in the rings 87, thus suitably stressing the springs 91 and providing an appropriate engagement force between the outer rings 87 and the friction surfaces 85, 86 on the outer ring 84 of the free-wheeling mechanism. The springs 91, then, furnish the required engagement force between the outer ring 84 and the friction surfaces 87, 88.

For partial release of the braking force, under controlled conditions, additional bolts 93 are provided. Bolts 93 are screwed into the ring 88 and are supported against an end surface of the ring 87 by respectively interposed balls 94. Upon screwing-in the bolts 93, the balls will bear against the respective end face of the holding ring 87 and thus act counter the force of the springs 91, to slightly lift the ring 88 away from ring 87. This permits controlled slippage of the outer ring 84 of the one-way or free-wheeling clutch mechanism with respect to the frame 89, and hence release of stored energy, and tension in a conveyor. Upon release of tension in the conveyor, the bolts 93 are released, that is, moved outwardly towards the right in FIG. 8, so that the initially set friction braking force determined by the springs 91 will automatically re-establish itself.

The arrangement of all the embodiments, FIGS. 3–8, is such that the respective outer ring 45, 64, 84 of the one-way clutch mechanism has some slight axial play or is movable axially within some limited distance to permit adjustment of the braking force, and of the braking elements, and to prevent interference of such adjustment upon possible replacement of friction surfaces. This is readily obtained in the examples of FIGS. 3 to 6 by freely locating the outer ring 45, 64 with respect to the ratchets 42, or rollers 62, respectively, without any specific axial connection, or interengagement. In the arrangement of FIGS. 7 and 8, it is customary to secure the wedging element 83 with respect to the outer ring 84 by C-rings 95, 96. The wedging elements may, however, move freely axially with respect to the inner ring 82, so that axial play of the outer ring 84 with respect to the inner ring 82 and the shaft 81 is also obtained.

Centering of the outer rings 45, 64, 84 with respect to the holding rings formed by the two parts 48, 49; 71, 72; 87, 88 can be obtained by guiding the outer ring within a concentric race formed in the respectively overlapping friction ring, for example by guiding the outer ring 45 within an end shoulder formed on the holding ring part 48. In the embodiment of FIG. 4, the ring element 49 is also centered with respect to the ring element 48 by the interengaging gearing arrangement 51, formed by externally projecting gears or splines on the ring 49 and internally projecting gears or splines from the ring element 48. Axial pressure is effected by the spring 52 in combination, if necessary, with suitable washers 55, retained by the cover 53. Axial guidance can be obtained, also, by the respectively circumferentially located bolts which pass through, or connect the respective ring elements, see FIGS. 6 and 8, in which the respective bolts 74, 90 provide for radial centering of the two holding ring elements with respect to each other.

Adjustment of the transfer torque as well as release of the holding torque is obtained by suitable tensioning or biassing of the axial position of the elements which provide for axial force, for example by washers, adjustment of bolt or nut heads or the like—compare FIGS. 4 and 6, 8. It is, of course, also possible to preset the torque, with a predetermined position or adjustment of bolt heads and use of springs of predetermined spring constants.

The arrangement of FIGS. 6 and 8 has the advantage that bias spring force can be accurately controlled, and that spring force unloaded or decreased if it is desired to permit the one-way clutch to slip under controlled condition. This arrangement permits highly accurate setting of maximum torque which any one of the return stop mechanisms are to accept. This torque should be below the maximum load capability of the return stop mechanism, and of the shaft with which it cooperates. The release or unloading devices, for example the hydraulic system of FIG. 6, or the mechanical screw-type unloading system of FIG. 8, then permits controlled release of tension within the transport belt or the like, as well as within any mechanism coupled thereto, for example if a transport belt is blocked by rocks, boulders, lumps, or the like. Release or slippage of the mechanism can be particularly accurately controlled by utilizing a fluid, particularly a hydraulic control system in which the pressure is supervised, for example by a pressure measuring instrument (FIG. 6) although this system is somewhat more expensive to install and build that that of the arrangement of FIG. 3, or FIG. 7, 8, for example.

It is generally desirable to locate both the tension, forming elements, for example the bolts and pressure springs, as well as the unloading or slippage force generating elements essentially uniformly about the circumference of the various rings. This permits elimination of special structural elements to in turn permit axial relative movement between the holding ring parts, free from tilting forces and tilting torques.

The system permits the particularly advantageous arrangement of telescoping the respective holding ring parts within each other, similar to an axial cylinder-piston arrangement, thereby effectively preventing contamination not only of the release mechanism, but also of the ratchet or one-way clutch mechanism. All free or empty spaces can be filled with a suitable elastic, compressible material, or, if desired, for example with grease or the like, in order to prevent penetration of contaminants, such dust, particles, and the like. Preferably, the tension springs as well as unloading arrangements are located radially inwardly of the telescoping fit between the holding rings parts.

Permitting the outer ring, possibly together with locking elements such as wedging elements 83, rollers 62, or ratchets 42, to have some play with respect to the inner ring—or vice versa—provides for uniform distribution of the spring forces on the respective elements, and hence uniformity of application of frictional force between the friction surfaces and the holding ring part. Further, it prevents excessive localized wear, if slippage should occur, and thus constributes to uniformity of wear on the respective friction surfaces, throughout the circumference of the mechanism.

Various changes and modifications may be made, and any features described, for example in connection with any one of the embodiments, may be used with any of the others, within the scope of the inventive concept. For example, any one of the friction surfaces 46, 47 (FIG. 4), 69, 70 (FIG. 6), 85, 86 (FIG. 8) can be formed as a separate friction material ring—see, for example, FIG. 6—floatingly retained in the axial space between the facing surfaces of the holding ring parts and the outer ring of the one-way or free-wheeling or overrunning clutch or coupling. The referenced Giese and Giese et al patents, U.S. Pat. Nos. 3,598,212 and 3,702,649, as well as U.S. Ser. No. 519,692, the disclosures of which are incorporated by reference, describe one-way clutches and their components, in detail.

We claim:

1. Return run or run-back stop mechanism for a conveyor (1, 2; 10, 11) having
   a conveyor shaft (4, 40, 60, 81) coupled to the conveyor;

a fixed frame (50, 73, 89);
a one-way clutch or coupling connection (7, 8; 25-32) between the conveyor shaft and the fixed frame to permit rotation of the conveyor shaft in one predetermined direction and prevent rotation of the conveyor shaft in reverse direction,
said one-way clutch connection having
a ring-shaped first element (45, 64, 84);
a circular second element (41, 61, 82) concentric with said first element;
and coupling means (42, 62, 83) located between said first and second elements, one (41, 61, 82) of said elements being coupled to the conveyor shaft, the other (45, 64, 84) of said elements being coupled to the fixed frame (50, 73, 89), and said coupling means (42, 62, 83) being arranged to permit free running of said conveyor shaft in said one predetermined direction, but cause engagement with the other element upon reverse direction of rotation,
said mechanism comprising, in accordance with the invention,
a rotatable friction coupling means positioned between the outer (45, 64, 84) of said coupling elements and the frame (50, 73, 89), including
a two-part holding ring (48, 49; 71, 72; 87, 88) having axial surfaces paired with and fitted to face axial surfaces of the other of said elements, at least one of said surfaces being formed as a friction surface (46, 47; 69, 70; 85, 86),
one part (48, 71, 87) of said two-part holding ring being secured to the frame and facing one axial surface of the other of said elements, the other part (49, 72, 88) being non-rotatably and axially movably secured to said first part and facing the other axial surface of the other of said elements;
and adjustable releasable axially acting pressure force means (91, 52, 76) adjustably pressing the other part axially against the other axial surface of the other of said elements for, selectively, locking the other of said elements in fixed position with respect to the frame to form a back-run stop, or frictionally controlled slipping between said elements and hence controlled back-run or return-run of the conveyor.

2. Mechanism according to claim 1, wherein the other (45, 64, 84) of said ring-shaped coupling elements is positioned radially outwardly of said circular element to form an outer ring;
and wherein the outer ring (45, 64, 84) is centered with respect to the axis of rotation of said conveyor shaft by centered running engagement with at least one of: the circular element (61); the holding ring (48, 87).

3. Mechanism according to claim 1, further including friction surface rings (46, 47; 69, 70; 85, 86) located on at least one of said surfaces to form said friction surfaces.

4. Mechanism according to claim 1, including friction material rings (46, 47; 69, 70; 85, 86) located between said surfaces and enhancing the friction effect of said surfaces, said friction material rings being located centered and floating between the holding ring parts and the axial surfaces of said other (45, 64, 84) of said elements.

5. Mechanism according to claim 1, wherein (FIGS. 3, 4) one (48) of said holding ring parts is formed with an inner gearing or spline, and the other (49) of said holding ring parts is formed with an outer gearing or splining, matching the inner gearing of said first part to non-rotatably lock said parts together, the other of said parts fitting within said first part;
and a compression spring element (52) applying compression spring force against the other (49) of sad parts and towards said first part to clamp the friction surfaces against each other, the compression spring elements being supported in force-transfer relation with respect to the first part (48).

6. Mechanism according to claim 5, wherein the compression spring element comprises a cup or dish spring (52) coaxial with respect to the second part (49).

7. Mechanism according to claim 1, (FIGS. 5-8) including
circumferentially distributed bolts (74, 90) axially extending and guiding the second part (72, 88) with respect to the first part (71, 87) while connecting said parts non-rotatably together;
and springs (76, 91) coaxially located on said bolts and applying axially directed pressure on said first and second parts towards each other to thereby provide friction pressure force against said surfaces.

8. Mechanism according to claim 7, including adjustment means (75, 92) between said bolts and said springs to adjustably control the compression force exerted by said springs on said parts of said holding ring.

9. Mechanism according to claim 1, wherein said adjustable axially acting pressure force means includes spring means applying pressure force on said two parts of the holding ring to clamp said surfaces against each other in frictional engagement, the axial clamping force being controlled by dimensioning of the number and spring constants of said spring elements to provide torque transfer via said friction surfaces which is less than the maximum permissible loading torque of the shaft.

10. Mechanism according to claim 1, wherein
(FIGS. 6-8) the adjustable, releasable, axially acting pressure force means comprises spring means (52, 76, 91) acting on said parts and tending to press said parts of said holding ring towards each other and thus clamp the friction surfaces towards each other;
and further including controllable spring counteracting or unloading means (78, 79; 93, 94) acting between said two parts of the holding ring to permit controlled release or counter-acting of the spring force, and hence of the clamping force of said frictional surfaces.

11. Mechanism according to claim 10, wherein (FIG. 8) the spring counter-acting or unloading means comprises circumferentially positioned bolts (93) screwed into one (88) of the holding ring parts and engageable with end surfaces thereof with an axial end surface of the other (87) of said holding ring parts.

12. Mechanism according to claim 10, wherein (FIG. 6) the spring counter-acting or unloading means comprises fluid-operated cylinder-piston means (78, 79) located between the two parts (71, 72) of said holding rings.

13. Mechanism according to claim 1, wherein the adjustable, releasable, axially acting pressure force means (52, 76, 91) are uniformly distributed over the circumference of the holding ring.

14. Mechanism according to claim 1, wherein the two parts (48, 49; 71, 72; 87, 88) of the holding ring are located radially outwardly of the outermost of said ring-shaped elements, and are formed with interengaging telescoping surfaces for axial movement of said holding ring parts with respect to each other and radial and axial encapsulation of the outer surfaces of said return stop mechanism.

15. Mechanism according to claim 14, wherein the adjustable, releasable, axially acting pressure force means (52, 76, 91) are located radially inwardly with respect to the telescoping surfaces of said two parts of the holding ring.

16. Mechanism according to claim 1, wherein the other of said ring-shaped coupling elements (45, 64, 84) is mounted within said mechanism for limited axial movement with respect to the shaft (40, 60, 81).

17. Mechanism according to claim 1, wherein the adjustable, releasable, axially acting pressure force means applies pressure on said friction surfaces of such extent that the frictional torque transferred between said friction surfaces is less than the maximum permissible torque for the shaft (40, 60, 81).

* * * * *